(12) United States Patent
Sabath et al.

(10) Patent No.: US 11,652,631 B2
(45) Date of Patent: May 16, 2023

(54) DISTRIBUTION OF SECURITY CREDENTIALS

(71) Applicant: International Business Machines Corporation, Armonk, NY (US)

(72) Inventors: Mariusz Sabath, Ridgefield, CT (US); Jia Jun Brandon Lum, White Plains, NY (US); Malgorzata Steinder, Leonia, NJ (US); Daniel Pittner, Esslingen am Neckar (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 508 days.

(21) Appl. No.: 16/455,168

(22) Filed: Jun. 27, 2019

(65) Prior Publication Data
US 2020/0412540 A1    Dec. 31, 2020

(51) Int. Cl.
*H04L 9/32*     (2006.01)
*H04L 9/30*     (2006.01)
*H04L 9/08*     (2006.01)

(52) U.S. Cl.
CPC .......... *H04L 9/3213* (2013.01); *H04L 9/0866* (2013.01); *H04L 9/30* (2013.01)

(58) Field of Classification Search
None
See application file for complete search history.

(56) References Cited

U.S. PATENT DOCUMENTS

| | | |
|---|---|---|
| 7,275,155 B1 | 9/2007 | Aull |
| 8,590,035 B2 | 11/2013 | Aaron |
| 9,172,592 B2 | 10/2015 | Choi et al. |
| 9,225,702 B2 | 12/2015 | Hallam-Baker |
| 9,860,234 B2 | 1/2018 | Sondhi et al. |
| 9,967,229 B2 | 5/2018 | Qi et al. |

(Continued)

FOREIGN PATENT DOCUMENTS

CN        106452764 A     2/2017

OTHER PUBLICATIONS

Mell, Peter, et al. "The NIST Definition of Cloud Computing." National Institute of Standards and Technology. Sep. 2011. 7 pages.
(Continued)

*Primary Examiner* — Arezoo Sherkat
(74) *Attorney, Agent, or Firm* — Amin, Turocy & Watson, LLP

(57) ABSTRACT

Techniques regarding the use of digital identity tokens describing a computer application to obtain authorization to confidential data based on one or more policies are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a trusted platform module component that can generate a digital identity token that is bound to a computer application process. The computer executable components can also comprise a key authenticity component that can compare the digital identity token to a security key to retrieve a security credential.

25 Claims, 12 Drawing Sheets

(56) References Cited

U.S. PATENT DOCUMENTS

| | | | |
|---|---|---|---|
| 10,142,348 B2 | 11/2018 | Sharma et al. | |
| 2011/0126047 A1* | 5/2011 | Anderson | G06F 9/455 709/224 |
| 2012/0174198 A1 | 7/2012 | Gould et al. | |
| 2012/0266231 A1* | 10/2012 | Spiers | H04L 9/3234 726/12 |
| 2013/0047199 A1* | 2/2013 | Radhakrishnan | G06F 21/34 726/1 |
| 2016/0105371 A1 | 4/2016 | Choi et al. | |
| 2018/0026893 A1* | 1/2018 | Jeuk | H04L 41/5051 370/236 |
| 2018/0063140 A1 | 3/2018 | D et al. | |
| 2018/0077142 A1* | 3/2018 | Thakkar | H04L 9/3213 |
| 2018/0101850 A1 | 4/2018 | Pisut, IV et al. | |
| 2018/0367528 A1* | 12/2018 | Schwarz | H04L 9/0894 |
| 2019/0028485 A1* | 1/2019 | Baird | H04L 63/083 |
| 2019/0140836 A1 | 5/2019 | Novak et al. | |
| 2019/0312730 A1* | 10/2019 | Engan | H04L 9/3213 |
| 2019/0349357 A1* | 11/2019 | Shukla | H04L 63/20 |
| 2020/0028935 A1* | 1/2020 | Sahay | G06F 9/5088 |
| 2020/0084202 A1* | 3/2020 | Smith | H04W 12/06 |
| 2020/0112487 A1* | 4/2020 | Inamdar | H04L 67/14 |
| 2020/0201679 A1* | 6/2020 | Wentz | G06F 16/29 |
| 2020/0336322 A1* | 10/2020 | Asanghanwa | H04L 41/5051 |
| 2020/0382363 A1* | 12/2020 | Woolward | G06F 16/9024 |
| 2020/0382556 A1* | 12/2020 | Woolward | G06F 16/9024 |
| 2020/0382560 A1* | 12/2020 | Woolward | H04L 63/205 |

OTHER PUBLICATIONS

"Envoy Proxy." https://www.envoyproxy.io/. Last Accessed Jun. 5, 2019. 7 pages.
"Kubernetes". https://kubernetes.io/. Last Accessed Jun. 5, 2019. 8 pages.
"Istio 1.1." https://istio.io/. Last Accessed Jun. 5, 2019. 3 pages.
"Spiffe: Secure Production Identity Framework for Everyone." https://spiffe.io/. Last Accessed Jun. 5, 2019. 5 pages.
"Vault." HashiCorp. https://www.vaultproject.io/. Last Accessed Jun. 5, 2019. 6 pages.
International Search Report and Written Opinion for International Application No. PCT/IB2020/055961 dated Oct. 12, 2020.

* cited by examiner

DISTRIBUTION OF SECURITY CREDENTIALS

BACKGROUND

The subject disclosure relates to the distribution of data security credentials, and more specifically, one or more data security processes that can limit access to security credentials for service provider administrators via a credential release system based on authorization of one or more computer application workloads.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate management of digital security credentials are described.

According to an embodiment, a system is provided. The system can comprise a memory that can store computer executable components. The system can also comprise a processor, operably coupled to the memory, and that can execute the computer executable components stored in the memory. The computer executable components can comprise a trusted platform module component that can generate a digital identity token that is bound to a computer application process. The computer executable components can also comprise a key authenticity component that can compare the digital identity token to a security key to retrieve a security credential.

According to an embodiment, a system is provided. The system can comprise a memory that can store computer executable components. The system can also comprise a processor, operably coupled to the memory, and that can execute the computer executable components stored in the memory. The computer executable components can comprise a trusted platform module component that can generate a digital identity token that is bound to a computer application process. The computer executable components can also comprise a policy authenticity component that can compare the digital identity token to a defined policy that governs the computer application process to retrieve a security credential.

According to an embodiment, a computer-implemented method is provided. The computer-implemented method can comprise generating, by a system operatively coupled to a processor, a digital identity token that is bound to a computer application process. The computer-implemented method can also comprise comparing, by the system, the digital identity token to a security key to retrieve a security credential.

According to an embodiment, a computer-implemented method is provided. The computer-implemented method can comprise generating, by a system operatively coupled to a processor, a digital identity token that is bound to a computer application process. The computer-implemented method can also comprise comparing, by the system, the digital identity token to a defined policy that governs the computer application process to retrieve a security credential.

According to an embodiment, a computer program product for distribution of a security credential is provided. The computer program product can comprise a computer readable storage medium having program instructions embodied therewith. The program instructions can be executable by a processor to cause the processor to generate, by a system operatively coupled to a processor, a digital identity token that is bound to a computer application process. The program instructions can also be executable by a processor to compare, by the system, the digital identity token to a security key to retrieve the security credential.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Some cloud computing customers require a cloud where the service provider cannot access the customer data. Conventional technologies implemented to reach this goal can include secure key transfer protocols, trusted platform modules, and/or host provenance and integrity. However, conventional technologies can be compromised by neglectful and/or malicious administrators, and/or entities posing as administrators.

Various embodiments of the present invention can be directed to computer processing systems, computer-implemented methods, apparatus and/or computer program products that facilitate the efficient, effective, and autonomous (e.g., without direct human guidance) data security processes that can limit access to credentials for service provider administrators via a credential release system based on authorization of one or more computer application workloads. For example, one or more embodiments can comprise the autonomous generation of one or more digital identity tokens that can be bound to a computer application process and/or signed by a chain of trust originating from one or more hardware devices. The one or more digital identity tokens can further be compared to one or more public keys and/or policies to facilitate authenticating the computer application process and retrieval of a security credential for exaction of the computer application process. For example, the one or more digital identity tokens can describe a subject computer application and/or can be used to obtain authorizations to confidential data based on one or more user defined polices.

The computer processing systems, computer-implemented methods, apparatus and/or computer program products employ hardware and/or software to solve problems that are highly technical in nature (e.g., limiting access to security credentials), that are not abstract and cannot be performed as a set of mental acts by a human. Various embodiments described herein, achieve enhanced data security measures by limiting access of security credentials to one or more humans, thereby reducing the potential for a data security breach caused by neglectful or malicious human action.

Figure 1:
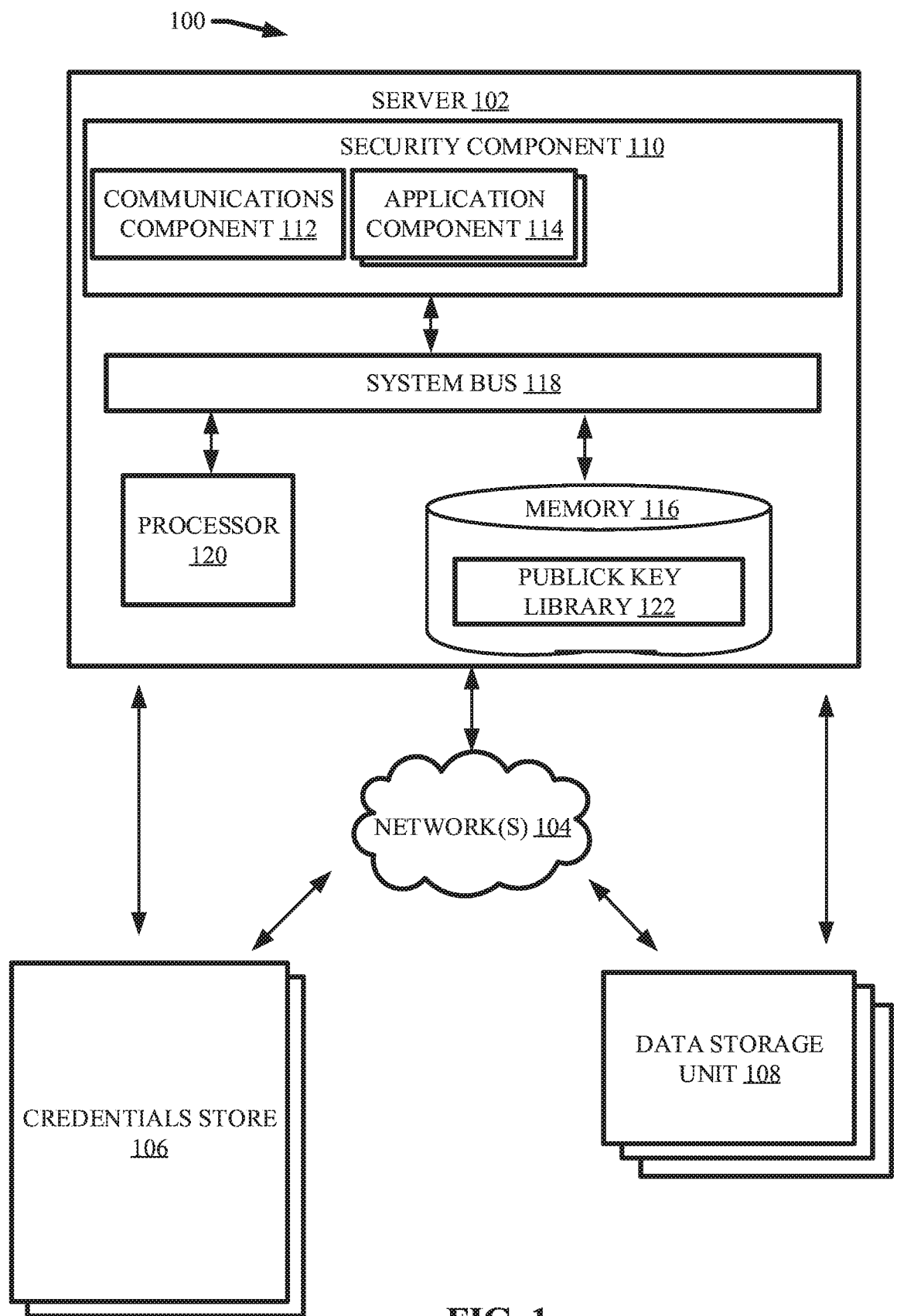
FIG. 1 illustrates a block diagram of an example, non-limiting system that can manage security credentials to execute one or more computer applications in accordance with one or more embodiments described herein.

FIG. 1 illustrates a block diagram of an example, non-limiting system 100 that can limit access to one or more security credentials for service provider administrators based on authorization of one or more computer application workloads. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, credentials stores 106, and/or data storage units 108. The server 102 can comprise security component 110. The security component 110 can further comprise one or more communications components 112 and/or application components 114. Also, the server 102 can comprise or otherwise be associated with at least one memory 116. The server 102 can further comprise a system bus 118 that can couple to various components such as, but not limited to, the security component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 302 can communicate with the one or more credentials stores 106 and/or data storage units 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the security component 110 can be provided on the one or more servers 102, it should be appreciated that the architecture of system 100 is not so limited. For example, the security component 110, or one or more components of security component 110, can be located at another computer device, such as another server device, a client device, etc.

The one or more credentials stores 106 can store, access, and/or distribute one or more dynamic security credentials. In various embodiments, the dynamic security credentials stored, accessed, and/or distributed by the one or more credentials stores 106 can be secrets for one or more applications and/or computing systems. Example security credentials can include, but are not limited to: tokens, passwords, certificates, encryption keys, application program interface ("API") keys, secure shell ("SSH") credentials, secrets, a combination thereof, and/or the like. In various embodiments, the one or more credentials stores 106 can encrypt and/or store the one or more security credentials. Further, the one or more security credentials can be ephemeral (e.g., programmatically generated when accessed and non-existent until read).

The one or more data storage units 108 can comprise one or more databases of confidential information. In various embodiments, the one or more data storage units 108 can be one or more database management systems that can facilitate the creation and/or access of one or more databases. Further, the one or more databases can be stored within one or more cloud computing environments, wherein the one or more data storage units 108 can manage access to the one or more databases. Additionally, the one or more databases can comprise data stored in one or more programming languages, such as JavaScript Object Notation ("JSON") and/or Structured Query Language ("SQL"). Example data storage units 108 can include, but are not limited to: one or more databases, cloud object storage ("COS"), a combination thereof, and/or the like.

The one or more communications components 112 can share data received by the server 102 with one or more other components of the server (e.g., one or more other components associated with the security component 110). Additionally, the one or more communications component 112 can send one or more outputs of the security component 110 with the one or more credentials store 106 and/or data storage units 108. In one or more embodiments, the one or more communications components 112 can send and/or receive data via a direct electrical connection and/or the one or more networks 104.

The one or more application components 114 can run one or more computer applications. For example, the one or more application components 114 can be one or more physical and/or virtual machines executing one or more applications and/or programs. Further, one or more applications running on the one or more application components 114 can be composed of one or more containers, wherein the one or more application components 114 can utilize one or more container orchestration platforms. A subject application can be composed of a single container or multiple co-located containers that are tightly coupled and/or share resources. For example, containers can share resources and/or dependencies, communicate with each other, and/or coordinate when and/or how the containers are terminated. Additionally, the one or more containers can be encapsulated by one or more pods, which can govern how the one or more containers can be run by the one or more application components 114.

In various embodiments, the one or more application components 114 can generate one or more sidecar containers with regards to the one or more applications. As used herein, the term "sidecar container" and/or "sidecar containers" can refer to one or more containers co-located within a pod with one or more applications, wherein the one or more sidecar containers can be coupled to, and share resources with, the one or more applications. The one or more sidecar containers can analyze the one or more applications. In one or more embodiments, the one or more applications and sidecar containers can be encapsulated within a pod together to form a single manageable entity. Additionally, the one or more sidecar containers can analyze the one or more applications within the pod to collect one or more claims, which can be one or more measurements describing one or more workloads of the one or more applications.

Figure 2:
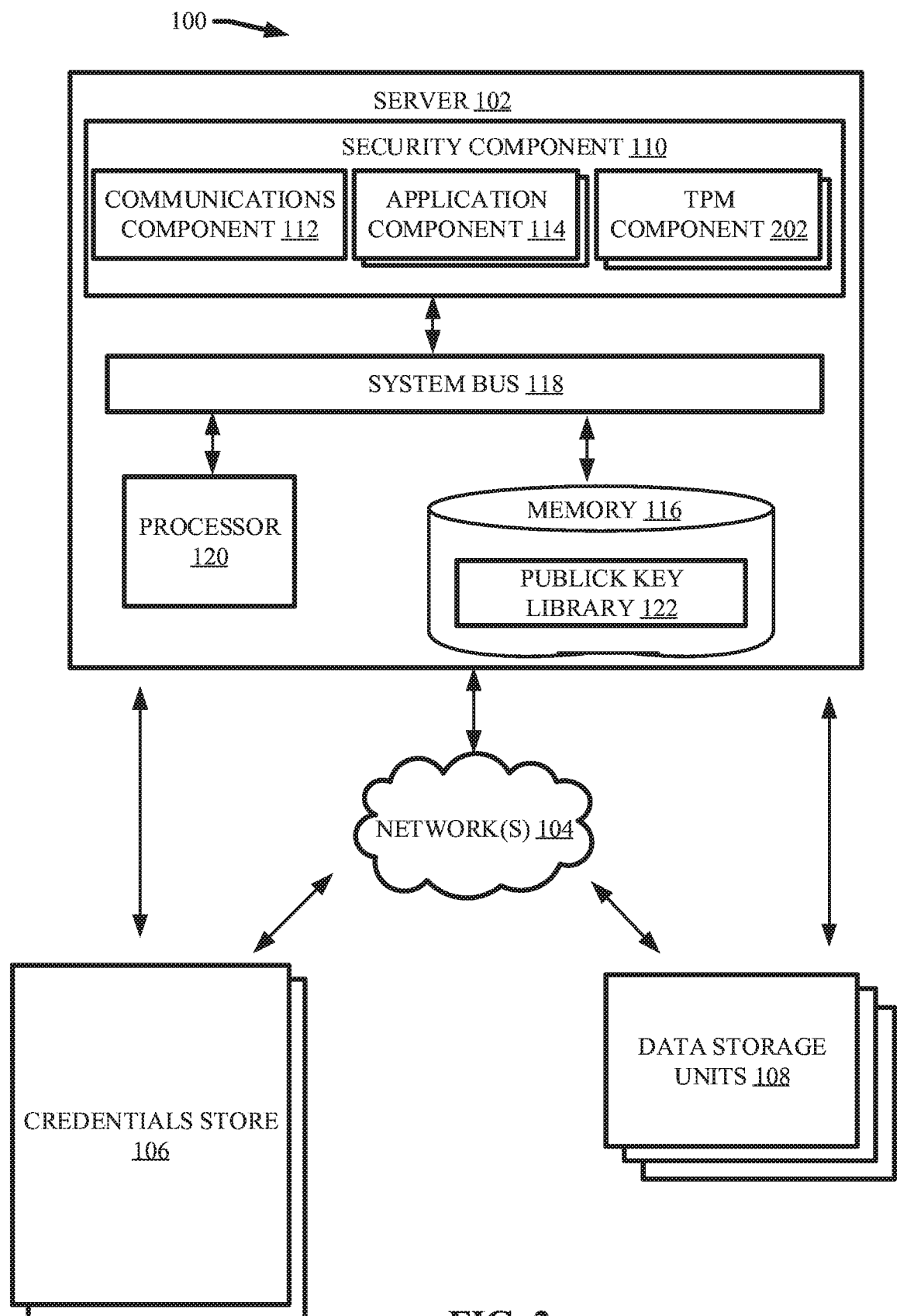
FIG. 2 illustrates a block diagram of an example, non-limiting system that can limit access to one or more security credentials for service provider administrators via a credential release system based on authorization of one or more computer application workloads in accordance with one or more embodiments described herein.

FIG. 2 illustrates a block diagram of the example, non-limiting system 100 further comprising one or more trusted platform module ("TPM") components 202 in accordance with one or more embodiments described herein. Repetitive description of like elements employed in other embodiments described herein is omitted for sake of brevity. The one or more TPM components 202 can comprise hardware that can generate one or more digital identity tokens. For example, the one or more digital identity tokens can represent the one or more claims in a Uniform Resource Locator ("URL") encoded format, wherein the one or more claims can be digitally signed and/or encrypted. For instance, the one or more digital identity tokens can be JSON web tokens ("JWT"), wherein the one or more claims can be encoded as one or more JSON objects; thereby enabling the one or more claims to be digitally signed and/or encrypted.

In various embodiments, the one or more TPM components 202 can generate one or more digital identity tokens based on the one or more claims collected by the one or more sidecar containers generated by the one or more application components 114. For example, the one or more TPM components 202 can utilize one or more private keys to generate the one or more digital identity tokens based on the one or more claims. Further, the one or more private keys can be held in confidence by the one or more TPM components 202. For instance, the private keys can remain in the possession of the one or more TPM components 202, inaccessible to the one or more applications, sidecar containers, administrators of the system 100, other components of the system 100, and/or other third parties. In one or more embodiments, each application component 114 can be associated with a respective TPM component 202. Alternatively, one or more clusters of application components 114 can be associated with the same TPM component 202.

In one or more embodiments, the one or more private keys, and thereby the one or more digital identity tokens, can correlate to one or more public keys comprised within one or more public key libraries 122. As shown in FIG. 2, the one or more public key libraries 122 can be stored within the one or more memories 116, and/or the one or more public key libraries 122 can be stored outside the server 102 (e.g., within a second server 102, an external memory unit, and/or a cloud computing environment). The one or more public keys can be read by one or more components and/or administrators of the system 100. However, management of the one or more public key libraries 122 can be reserved for trusted system 100 administrators. Thereby, various components of the system 100, and/or external parties to the system 100, can read the one or more public keys, but cannot modify the one or more public key libraries 122 (e.g., cannot alter a public key, remove a public key from the public key library 122, and/or add a public key to the public key library 122).

The one or more TPM components 202 can utilize the data comprised within the claims to generate one or more digital identity tokens that are bound to execution of the subject application. Additionally, the one or more TPM components 202 can utilize the one or more private keys to establish a chain of trust denoted by a signature comprised within the one or more digital identity tokens. Furthermore, the one or more TPM components 202 can define an expiration date for the one or more digital identity tokens. For example, the one or more digital identity tokens can expire after a defined amount of time (e.g., fractions of a second, seconds, minutes, hours, days, and/or the like).

Figure 3:
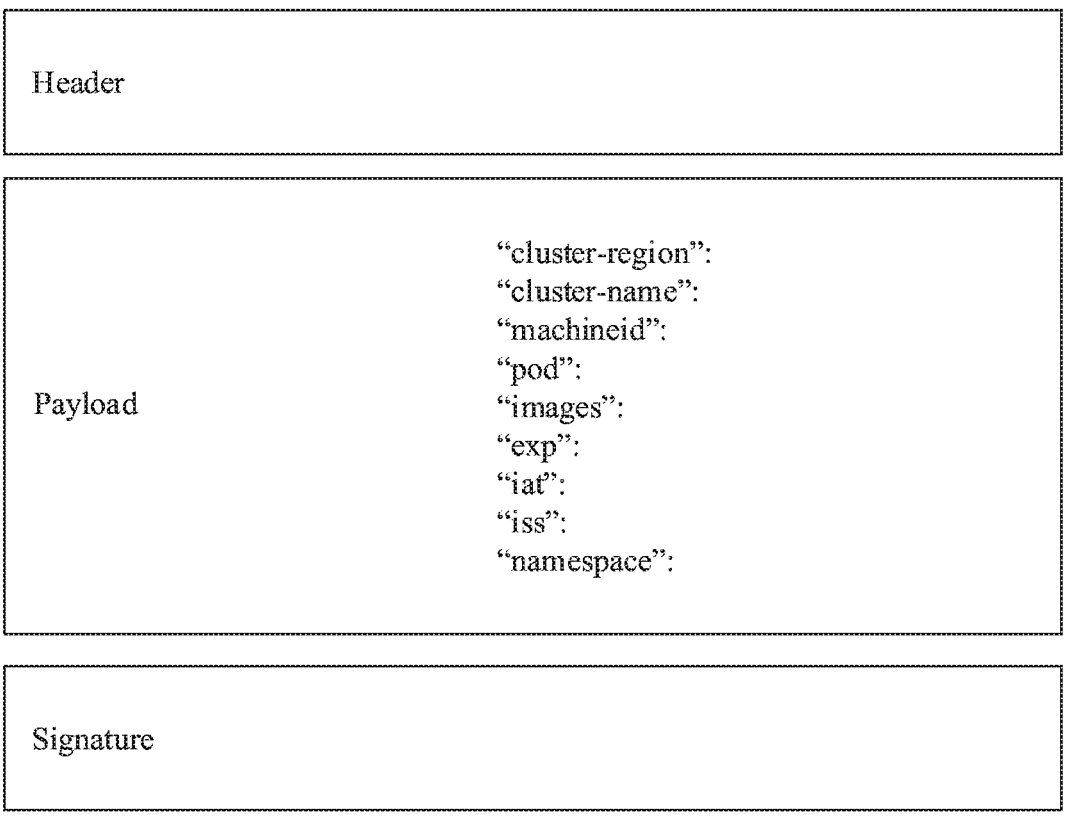
FIG. 3 illustrates a diagram of an example, non-limiting digital identity token that can facilitate management of security credentials in one more data security systems in accordance with one or more embodiments described herein.

FIG. 3 illustrates a diagram of an example, non-limiting structure 300 of one or more digital identity tokens that can be generated by the one or more TPM components 202 in accordance with one or more embodiments described herein. Repetitive description of like elements employed in other embodiments described herein is omitted for sake of brevity. As shown in FIG. 3, the one or more digital identity tokens can comprise a header, a payload, and a signature.

The header can comprise a reference title for the subject digital identity token and/or can describe one or more cryptographic operations. For example, wherein the one or more digital identity tokens are JWTs, the header can be a JSON web signature ("JWS") header or a JSON web encryption ("JWE") header. The payload can comprise the data comprised within the one or more claims. Example data comprised within the one or more claims, and/or thereby the payload of the one or more digital identity tokens, can include, but is not limited to: a geographical region associated with one or more application components 114 running the subject application (e.g., represented in FIG. 3 by "cluster-region"), a reference name associated with one or more application component 114 running the subject application (e.g., represented in FIG. 3 by "cluster-name" with regards to a cluster of application components 114 and/or "machineid" with regards to a particular application component 114 within the cluster), a reference name associated with a pod encapsulating the subject containers of the application (e.g., represented in FIG. 3 by "pod"), a workload of the one or more containers (e.g., represented in FIG. 3 by "images"), an expiration date for the digital identity token (e.g., represented in FIG. 3 by "exp"), an initiation date for the digital identity token (e.g., represented in FIG. 3 by "iat"), an issuer of the subject application (e.g., represented in FIG. 3 by "iss"), a namespace (e.g., represented in FIG. 3 by "namespace"), compliance scan results, vulnerability, specific version information, current network configurations and/or information, open ports, a combination thereof, and/or the like. Further, the signature can comprise a signature from the one or more TPM components 202 that generated by the digital identity token using the one or more private keys.

Figure 4:
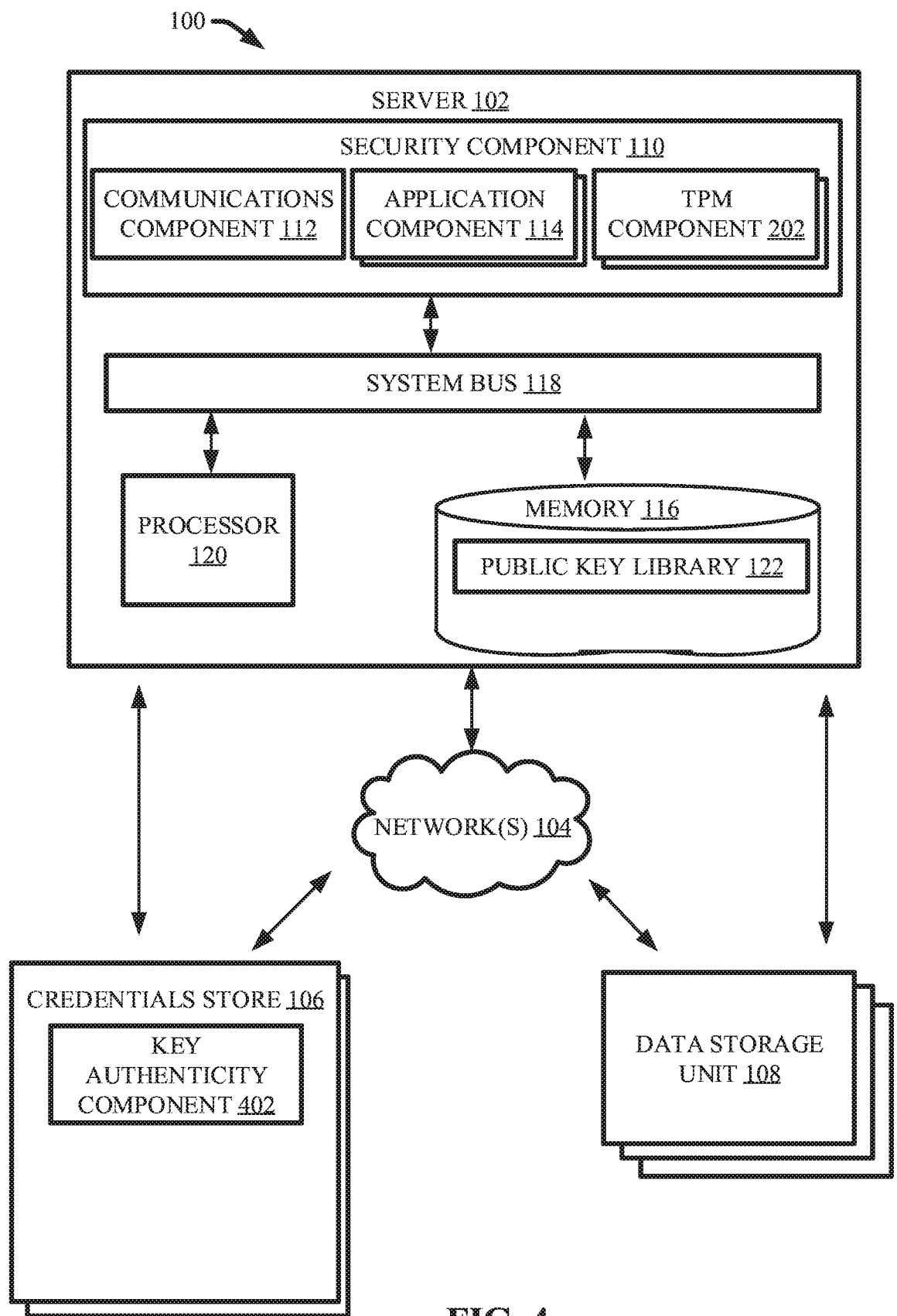
FIG. 4 illustrates a diagram of an example, non-limiting system that can implement one or more identity authenticity mechanisms based on a comparison of one or more digital identity tokens and publicly available digital keys in accordance with one or more embodiments described herein.

FIG. 4 illustrates a diagram of the example, non-limiting system 100 further comprising key authenticity component 402 in accordance with one or more embodiments described herein. Repetitive description of like elements employed in other embodiments described herein is omitted for sake of brevity. As shown in FIG. 4, the one or more key authenticity components 402 can be comprised within the one or more credentials store 106.

In various embodiments, the credentials store 106 can determine whether the one or more applications running on the one or more application components 114 are authorized to receive one or more security credentials based on the one or more digital identity tokens. For example, the key authenticity component 402 can utilize the one or more digital identity tokens to authenticate that the one or more applications. In one or more embodiments, the key authenticity component 402 can compare the digital identity token to the one or more public keys comprised within the one or more public key libraries 122. In one or more embodiments, key authenticity component 402 can compare the digital identity token to a chain of certificates and/or an intermediate certificate authority. In response to comparing the one or more digital identity tokens to one or more public keys, the key authenticity component 402 can determine that the subject application is authorized to receive one or more security credentials.

Figure 5:
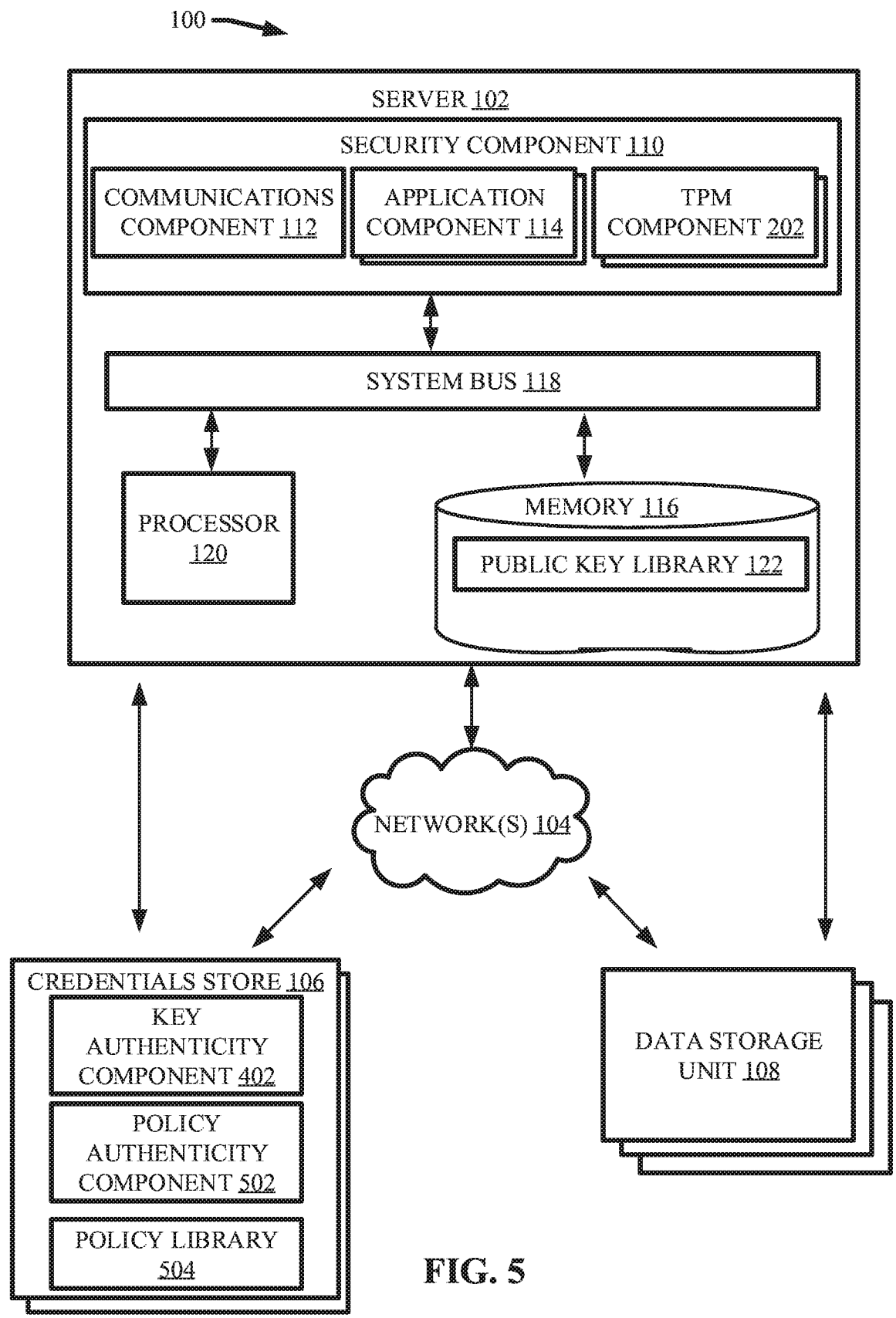
FIG. 5 illustrates a diagram of an example, non-limiting system that can implement one or more identity authenticity mechanisms based on a comparison of one or more digital identity tokens and governing policies in accordance with one or more embodiments described herein.

FIG. 5 illustrates a diagram of the example, non-limiting system 100 further comprising policy authenticity component 502 and/or policy library 504 in accordance with one or more embodiments described herein. Repetitive description of like elements employed in other embodiments described herein is omitted for sake of brevity. As shown in FIG. 5, the one or more policy authenticity components 502 and/or policy libraries 504 can be comprised within the one or more credentials store 106.

In various embodiments, the credentials store 106 can further determine which security credentials to allocate to the one or more applications based on one or more governing policies and/or the digital identity token. For example, the policy authenticity component 502 can compare the data comprised within the payload of the one or more digital identity tokens with one or more governing policies comprised within one or more policy libraries 504. The one or more governing policies can delineate which data managed by the one or more data storage units 108 can be accessed, the amount of data that can be accessed, and/or the circumstances under which the data can be accessed. For instance, the one or more governing policies can afford different levels of access to the data managed by the one or more data storage units 108 to different applications. In another example, the one or more governing policies can afford different levels of access to the data managed by the one or more data storage units 108 to the same application depending on the context of the application's execution (e.g., which application components 114 are running the application, and/or how the application components 114 are running the application). In one or more embodiments, the one or more governing policies can be defined by one or more owners of the data managed by the one or more data storage units 108.

Based on the comparison between the one or more digital identity tokens and the governing policies, the policy authenticity component 502 can determine which restrictions, if any, are applicable to the subject execution of the one or more applications. Thus, the key authenticity component 402 can determine whether the subject application is authorized to access data managed by the one or more data storage units 108, and/or the policy authenticity component 502 can determine whether any data access restrictions apply to the subject execution of the application. In one or more embodiments, the credentials store 106 can allocate one or more security credentials to an authorized application based on the determinations of the key authenticity component 402 and the policy authenticity component 502. In some embodiments, the credentials store 106 can allocate one or more security credentials to an authorized application based on the determinations of the key authenticity component 402 or the policy authenticity component 502. The security credentials can enable the application to access data managed by the one or more data storage units 108. Also, the one or more security credentials can restrict an amount and/or level of the access based on the application and/or execution of the application in accordance with one or more governing policies (e.g., which can be defined by owners of the data).

Figure 6:
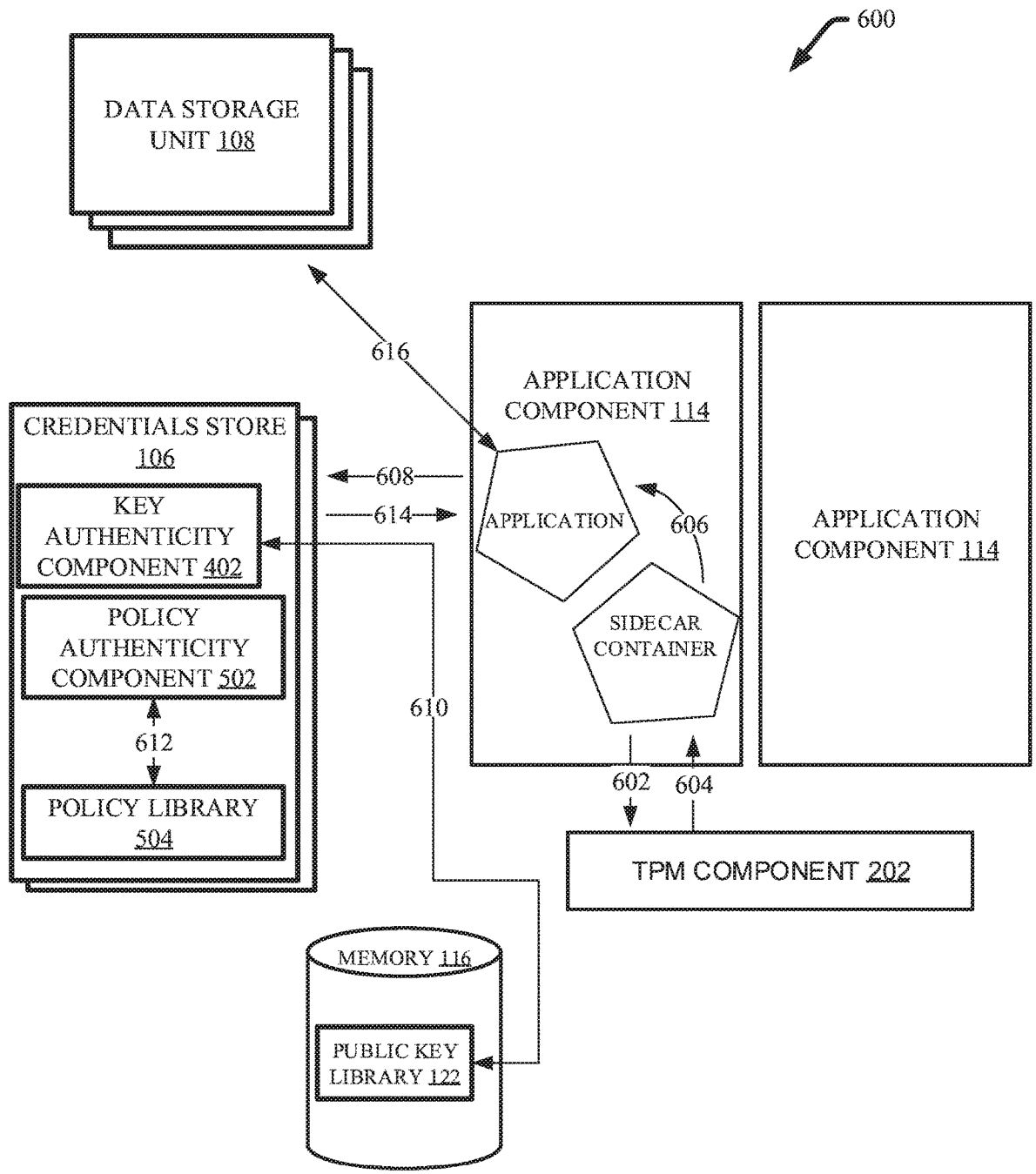
FIG. 6 illustrates a diagram of an example, non-limiting computer application process that can be executed by one or more systems that can limit access to one or more security credentials for service provider administrators via a credential release system based on authorization of one or more computer application workloads in accordance with one or more embodiments described herein.

FIG. 6 illustrates a diagram of an example, non-limiting computer application process 600 that can be implemented by the system 100 in accordance with one or more embodiments described herein. Repetitive description of like elements employed in other embodiments described herein is omitted for sake of brevity. In various embodiments, the communications depicted and/or described with regards to FIG. 6 can be facilitated by the one or more networks 104. As shown in FIG. 6, during the computer application process 600 one or more application components 114 (e.g., a cluster of two application components 114) can facilitate execution of an application. For example, the one or more application components 114 can generate one or more sidecar containers, as described herein.

At 602, the one or more sidecar containers can collect one or more claims regarding the application and send the claims to the one or more TPM components 202. For example, the claims can describe one or more workloads of the application. At 604, the one or more TPM components 202 can generate one or more digital identity tokens based on the claims and one or more private keys held in confidence by the one or more TPM components 202. Further, the one or more TPM components 202 can send the one or more digital identity tokens to the one or more sidecar containers. At 606, the one or more sidecar containers can share the one or more digital identity tokens with the one or more applications. In various embodiments, the application can remain unaware of how the one or more digital identity tokens were formed and/or what formed the one or more digital identity tokens. Thus, the system 100 does not require the security component 110 to store one or more security credentials for authentication with the one or more credentials store; rather the security component (e.g., via the applications component 114 and/or the TPM component 202) can provide the one or more digital identity tokens for authentication, which can be dynamically generated (e.g., via TPM component 202) based on one or more claims collected by the one or more sidecar containers (e.g., via application component 114).

At 608, the application can send the one or more digital identity tokens to the one or more credentials stores 106 to acquire one or more security credentials. At 610, the key authenticity component 402 can compare the one or more digital identity tokens with one or more public keys comprised within one or more public key libraries 122. In various embodiments, the one or more public key libraries 122 can be managed by one or more trusted system 100 administrators. In one or more embodiments, the one or more public key libraries 122 can be managed by one or more entities and/or systems defined by one or more owners of the confidential data stored within the one or more data storage units 108. Trusted management of the one or more public libraries 122 can enable the identification of counterfeit digital identity tokens attempting to gain authorization from the one or more credentials stores 106. In response to matching the one or more digital identity tokens to one or more public keys, the key authenticity component 402 can determine that the application is authorized to receive one or more security credentials. In contrast, the key authenticity component 402 can determine that the application is not authorized to receive one or more security credentials in response to failing to match the one or more digital identity tokes with one or more public keys.

Wherein the key authenticity component 402 determines that the application is an authorized application, the policy authenticity component 502 can further compare the one or more digital identity tokens to one or more policies comprised within one or more policy libraries 504. The one or more policies can delineate one or more data access restrictions applicable to the application and/or the subject execution of the application (e.g., as described herein). Based on the comparison at 612, the policy authenticity component 502 can determine which data access restrictions, if any, are applicable to the subject execution of the application. At 614, the credentials store 106 can allocate one or more security credentials to the application based on the determinations of the key authenticity component 402 and/or the policy authenticity component 502. For example, the one or more security credentials can be allocated in response to the application being authorized to access data managed by the one or more data storage units 108, and/or the security credentials can dictate the amount and/or level of data access granted to the application.

At 616, the application can use the one or more allocated security credentials to access the one or more data storage units 108 and/or retrieve stored data in accordance with any data access restrictions dictated by the one or more security credentials. The application can subsequently utilize the retrieved data to execute one or more tasks and/or complete the computer application process 600.

Figure 7:
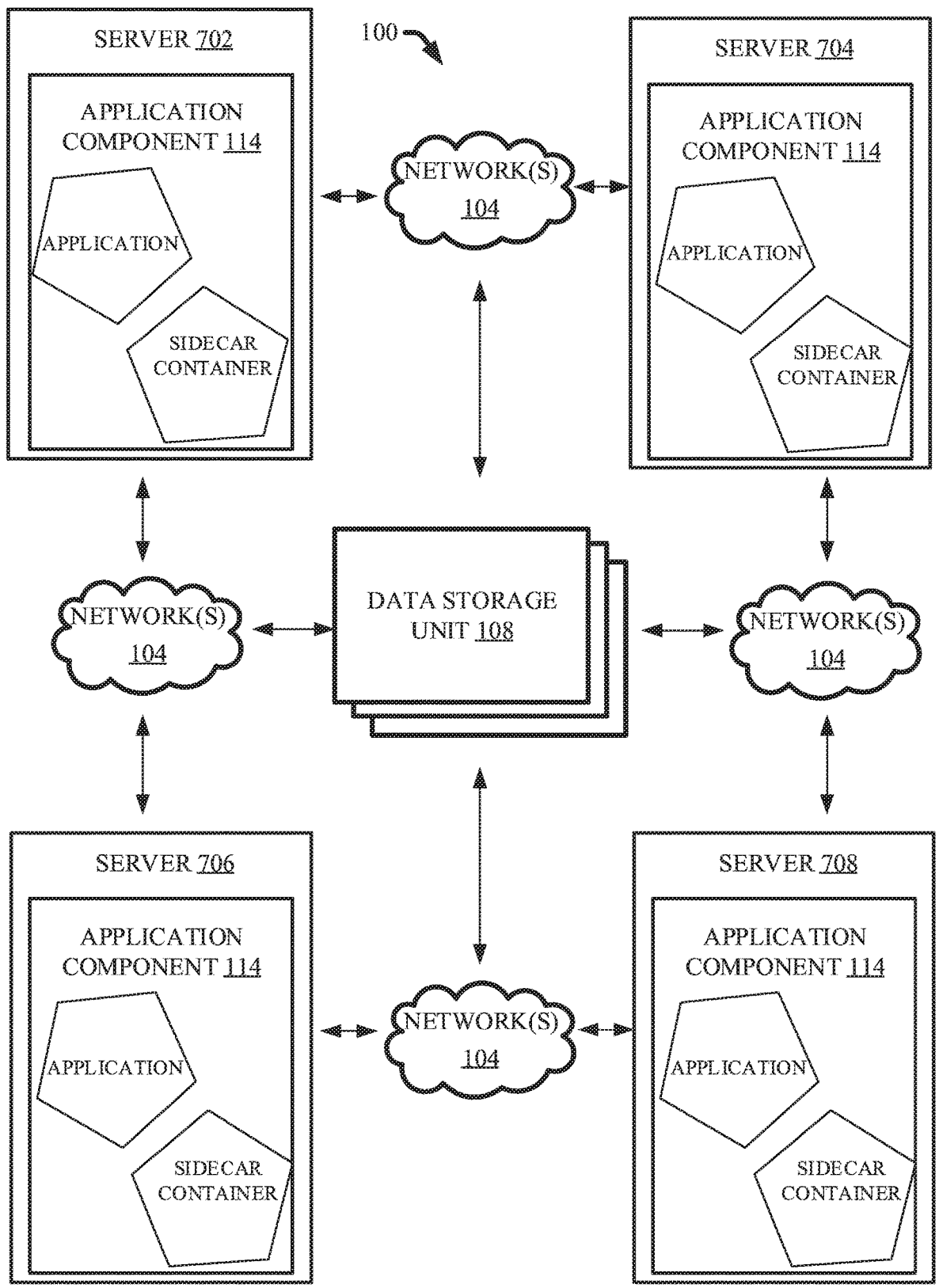
FIG. 7 illustrates a block diagram of an example, non-limiting system that can limit access to one or more security credentials for service provider administrators via a credential release system based on authorization of one or more computer application workloads in accordance with one or more embodiments described herein.

FIG. 7 illustrates a diagram of the example, non-limiting system 100 comprising multiple servers 102 that can facilitate execution of an application in multiple locations in accordance with one or more embodiments described herein. Repetitive description of like elements employed in other embodiments described herein is omitted for sake of brevity. As shown in FIG. 7, the system 100 can comprise, for example: a first server 702, a second server 704, a third server 706, and/or a fourth server 708. The first server 702, second server 704, third server 706, and/or fourth server 708 can each: comprise one or more of the various components described herein with regards to server 102, be positioned in different locations, and/or communicate via one or more networks 104 (e.g., via a cloud computing environment). For example, the first server 702 can be located in London, the second server 704 can be located in Dallas, the third server 706 can be located in Berlin, and/or the fourth server 708 can be located in Washington D.C.

To exemplify one or more of the capabilities of the system 100, the following example scenario considers a multinational company having locations in Dallas and Berlin. The company can utilize the system 100 to execute one or more computer application processes 600 and/or define the following governing policies with regards to employee data stored within one or more data storage units 108. The first policy can delineate that there are two levels of data access: full data access, which can include the following information regarding the company's employees: first name, last name, ranking, social security numbers, and/or phone numbers; and/or limited data access, which can include only the first name, last name and ranking information. A second policy can delineate that only applications originating requests from the company's server in Berlin and using a specific, trusted, signed container can be granted full data access; otherwise applications originating requests from the company's server in Berlin can be granted limited data access. A third policy can delineate that an audit company located in Washington D.C. can temporarily acquire full data access to conduct a tax audit. A fourth policy can delineate that applications originating requests from the company's server in Dallas can be granted limited data access. Also, a fifth policy can delineate that applications originating requests from geographical locations other than Dallas and/or Berlin are not authorized to access the employee data.

The first server 702, second server 704, third server 706 and/or fourth server 708 can each run the same application via one or more computer application processes 600 but achieve different accessibility to the one or more data storage units 108. For example, the digital identity tokens generated on the various servers 102 can be different at least due to the differing geographical locations of each server 102. Further, the credentials store 106 can reach different determinations regarding the execution of the application on the plurality of servers 102 based on the differing content of the digital identity tokens and/or the policies defined above (e.g., stored in the one or more policy libraries 504).

For instance, the credentials store 106 can determine that the application, when executed on the first server 702, is not allocated a security credential in accordance with the fifth policy at least because the security credential request originated from London (e.g., as delineated by the digital identity token generated by a TPM component 202 of the first server 702). In another instance, the credentials store 106 can determine that the application, when executed on the second server 704, is allocated a security credential that affords limited data access in accordance with the fourth policy at least because the security credential request originated from an authorized application in Dallas (e.g., as delineated by the digital identity token generated by a TPM component 202 of the second server 704). In another instance, the credentials store 106 can determine that the application, when executed on the third server 706, can be allocated a security credential that affords full data access when the specifics of the second policy are met and/or allocated a security credential that affords limited data access when the specifics of the second policy are not met at least because the security credential request originated from an authorized application in Berlin (e.g., as delineated by the digital identity token generated by a TPM component 202 of the third server 706). In another instance, the credentials store 106 can determine that the application, when executed on the fourth server 708, is allocated a security credential that affords full data access in accordance with the third policy at least because the security credential request originated from an authorized application in Washington D.C. (e.g., as delineated by the digital identity token generated by a TPM component 202 of the fourth server 708).

Figure 8:
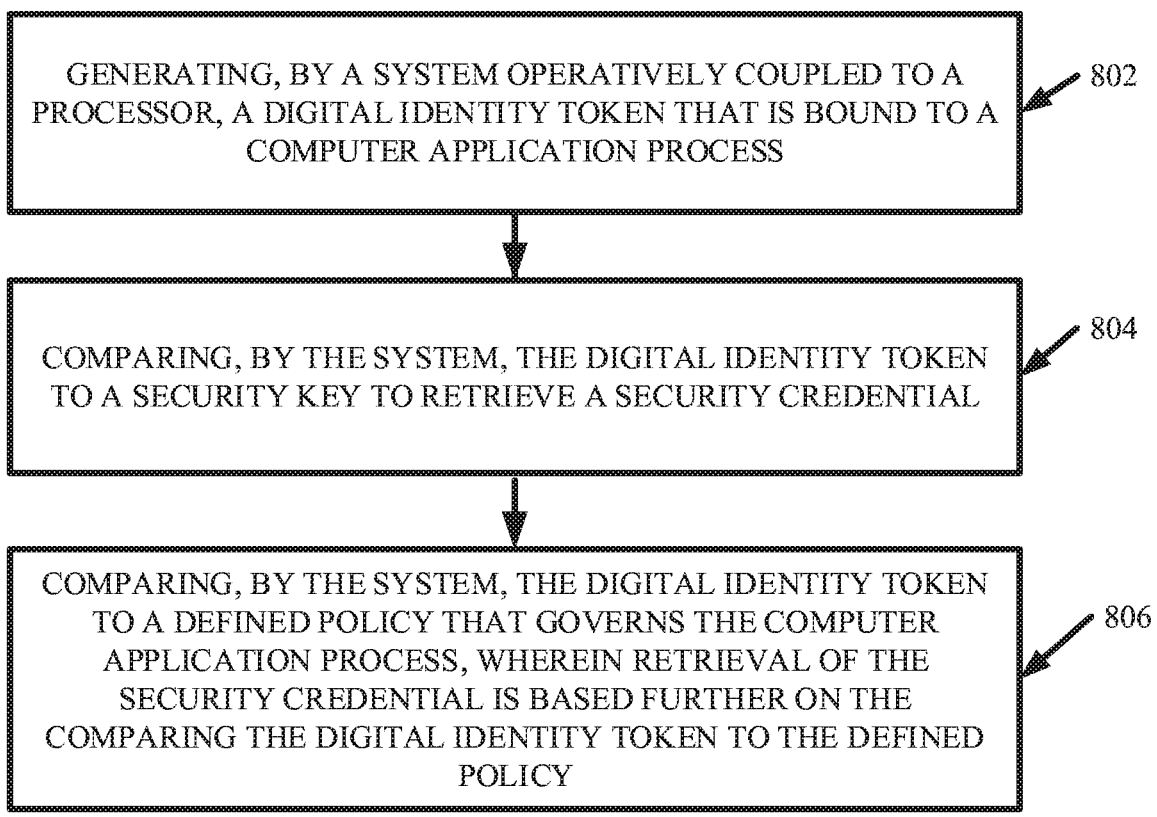
FIG. 8 illustrates a flow diagram of an example, non-limiting method that can facilitate limiting access to credentials for service provider administrators via a credential release system based on authorization of one or more computer application workloads in accordance with one or more embodiments described herein.

FIG. 8 illustrates a flow diagram of an example, non-limiting method 800 that can facilitate limiting access to credentials for service provider administrators via a credential release system 100 based on authorization of one or more computer application workloads in accordance with one or more embodiments described herein. Repetitive description of like elements employed in other embodiments described herein is omitted for sake of brevity.

At 802, the method 800 can comprise generating (e.g., via TPM component 202), by a system 100 operatively coupled to one or more processors 120, one or more digital identity tokens that can be bound to a computer application process (e.g., in accordance with exemplary computer application process 600). Further, in various embodiments, the one or more digital identity tokens can be signed by a chain of trust that can originate from hardware (e.g., the TPM component 202). For example, the one or more digital identity tokens can be generated based on one or more claims collected from a subject application and/or one or more private keys, as described herein. For instance, one or more sidecar containers (e.g., generated via application component 114) can analyze one or more subject applications and/or collect one or more measurements describing one or more workloads of the applications. In various embodiments, the one or more digital identity tokens can be characterized by exemplary structure 300 described herein (e.g., the one or more digital identity tokens can be JWTs). Also, in one or more embodiments the one or more digital identity tokens can be set (e.g., via the TPM component 202) to expire after a defined period of time (e.g., fractions of a second, seconds, minutes, etc.).

At 804, the method 800 can comprise comparing (e.g., via key authenticity component 402), by the system 100, the one or more digital identity tokens to one or more security keys to retrieve one or more security credentials (e.g., for execution of the computer application process. As described herein, the one or more security keys can be public keys comprised within one or more public libraries 122 managed by one or more trusted administrators of the system 100. Further, the one or more public keys can correlate to one or more private keys utilized to generate the one or more digital identity tokens, and/or can thereby facilitate authenticating the one or more digital identity tokens.

For example, the comparison at 804 can comprise determining whether the one or more digital identity tokens match to, or otherwise correlate to, one or more of the public keys. Based on the comparison at 804, the system 100 (e.g., via key authenticity component 402) can determine whether the analyzed digital identity token is authentic (e.g., generated by the system 100) and/or whether the subject computer application process is authorized to receive one or more security credentials. For example, a digital identity token comprising fabricated data (e.g., a fictional payload) and/or altered data (e.g., an altered payload) can be identified by the system 100 (e.g., via the key authenticity component 402) via the comparison at 804 (e.g., due to decencies between the digital identity tokens and the available public keys). In another example, one or more applications that are unauthorized to receive security credentials can be identified by the comparison at 804 (e.g., due to decencies between the digital identity tokens and the available public keys).

At 806, the method 800 can further comprise comparing (e.g., via policy authenticity component 502), by the system 100, the one or more digital identity tokens to one or more defined policies that can govern the subject computer application process (e.g., in accordance with exemplary computer application process 600), wherein the retrieval of the one or more security credentials can be based further on the comparison at 806. As described herein, the one or more policies can be comprised within one or more policy libraries 504 and/or can be defined by one or more owners of data managed via distribution of the security credentials. The comparing at 806 can facilitate identifying any data accessibility restrictions applicable to the computer application process.

For example, the comparing at 806 can determine whether the application's authorization to access confidentially held data is subject to one or more restrictions. For instance, the one or more security credentials allocated to the subject computer application process can be further based on one or more workloads of the subject application. Thereby, in various embodiments the system 100 can allocate one or more security credentials to a subject application to facilitate execution of the computer application process based on: the authorization status of the subject application, the authenticity of one or more digital identity tokens, and/or one or more data access restrictions defined by one or more governing policies.

Figure 9:
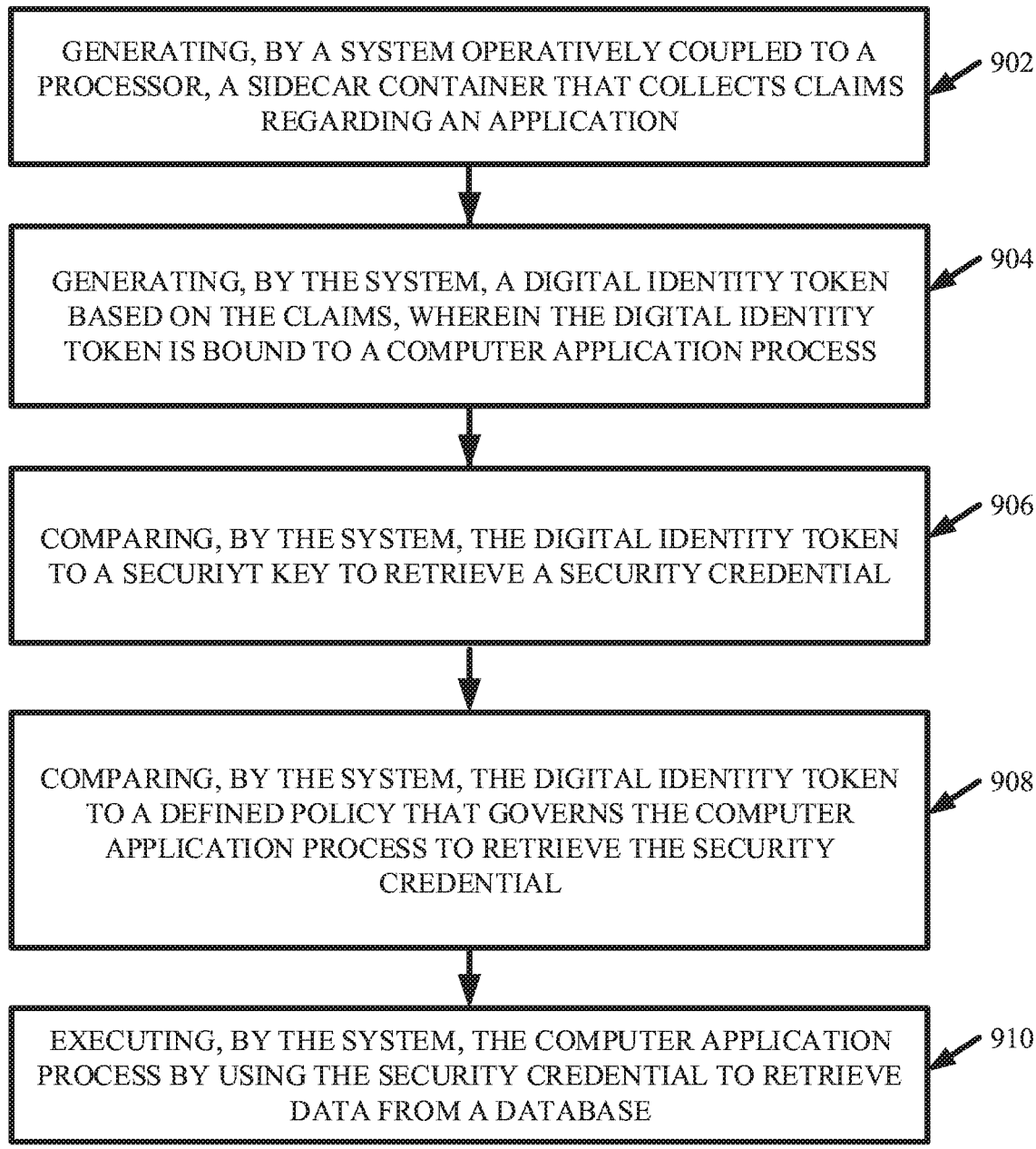
FIG. 9 illustrates a flow diagram of an example, non-limiting method that can facilitate limiting access to credentials for service provider administrators via a credential release system based on authorization of one or more computer application workloads in accordance with one or more embodiments described herein.

FIG. 9 illustrates a flow diagram of an example, non-limiting method 900 that can facilitate limiting access to credentials for service provider administrators via a credential release system 100 based on authorization of one or more computer application workloads in accordance with one or more embodiments described herein. Repetitive description of like elements employed in other embodiments described herein is omitted for sake of brevity.

At 902, the method 900 can comprise generating (e.g., via application component 114), by a system 100 operatively coupled to one or more processors 120, one or more sidecar containers that can collect one or more claims regarding an application. For example, the one or more sidecar containers can collect one or more measurements describing one or more workloads of the applications. In various embodiments, the one or more applications can be composed of one or more containers encapsulated within one or more pods with the one or more sidecar containers.

At 904, the method 900 can comprise generating (e.g., via TPM component 202), by the system 100, one or more digital identity tokens that can be bound to a computer application process (e.g., in accordance with exemplary computer application process 600). Further, in various embodiments, the one or more digital identity tokens can be signed by a chain of trust that can originate from hardware (e.g., the TPM component 202). For example, the one or more digital identity tokens can be generated based on one or more claims collected by the one or more sidecar containers and/or one or more private keys, as described herein. In various embodiments, the one or more digital identity tokens can be characterized by exemplary structure 300 described herein (e.g., the one or more digital identity tokens can be JWTs). Also, in one or more embodiments the one or more digital identity tokens can be set (e.g., via the TPM component 202) to expire after a defined period of time (e.g., fractions of a second, seconds, minutes, etc.).

At 906, the method 900 can comprise comparing (e.g., via key authenticity component 402), by the system 100, the one or more digital identity tokens to one or more security keys to facilitate retrieval of one or more security credentials (e.g., for execution of the computer application process). As described herein, the one or more security keys can be public keys comprised within one or more public libraries 122 managed by one or more trusted administrators of the system 100. Further, the one or more public keys can correlate to one or more private keys utilized to generate the one or more digital identity tokens, and/or can thereby facilitate authenticating the one or more digital identity tokens.

For example, the comparison at 906 can comprise determining whether the one or more digital identity tokens match to, or otherwise correlate to, one or more of the public keys. Based on the comparison at 906, the system 100 (e.g., via key authenticity component 402) can determine whether the analyzed digital identity token is authentic (e.g., generated by the system 100) and/or whether the subject computer application process is authorized to receive one or more security credentials. For example, a digital identity token comprising fabricated data (e.g., a fictional payload) and/or altered data (e.g., an altered payload) can be identified by the system 100 (e.g., via the key authenticity component 402) via the comparison at 906 (e.g., due to decencies between the digital identity tokens and the available public keys). In another example, one or more applications that are unauthorized to receive security credentials can be identified by the comparison at 906 (e.g., due to decencies between the digital identity tokens and the available public keys).

At 908, the method 900 can further comprise comparing (e.g., via policy authenticity component 502), by the system 100, the one or more digital identity tokens to one or more defined policies that can govern the subject computer application process (e.g., in accordance with exemplary computer application process 600), wherein the retrieval of the one or more security credentials can be based further on the comparison at 806. As described herein, the one or more policies can be comprised within one or more policy libraries 504 and/or can be defined by one or more owners of data managed via distribution of the security credentials. The comparing at 908 can facilitate identifying any data accessibility restrictions applicable to the computer application process.

For example, the comparing at 908 can determine whether the application's authorization to access confidentially held data is subject to one or more restrictions. For instance, the one or more security credentials allocated to the subject computer application process can be further based on one or more workloads of the subject application. Thereby, in various embodiments the system 100 can allocate one or more security credentials to a subject application to facilitate execution of the computer application process based on: the authorization status of the subject application, the authenticity of one or more digital identity tokens, and/or one or more data access restrictions defined by one or more governing policies.

At 910, the method 900 can also comprise executing (e.g., via the application component 114), by the system 100, the computer application process by using the one or more allocated security credentials to retrieve data from one or more databases (e.g., managed by one or more data storage units 108). For example, the one or more subject applications can retrieve data from one or more data storage units 108 in accordance with one or more accessibility restrictions dictated by the one or more security credentials.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
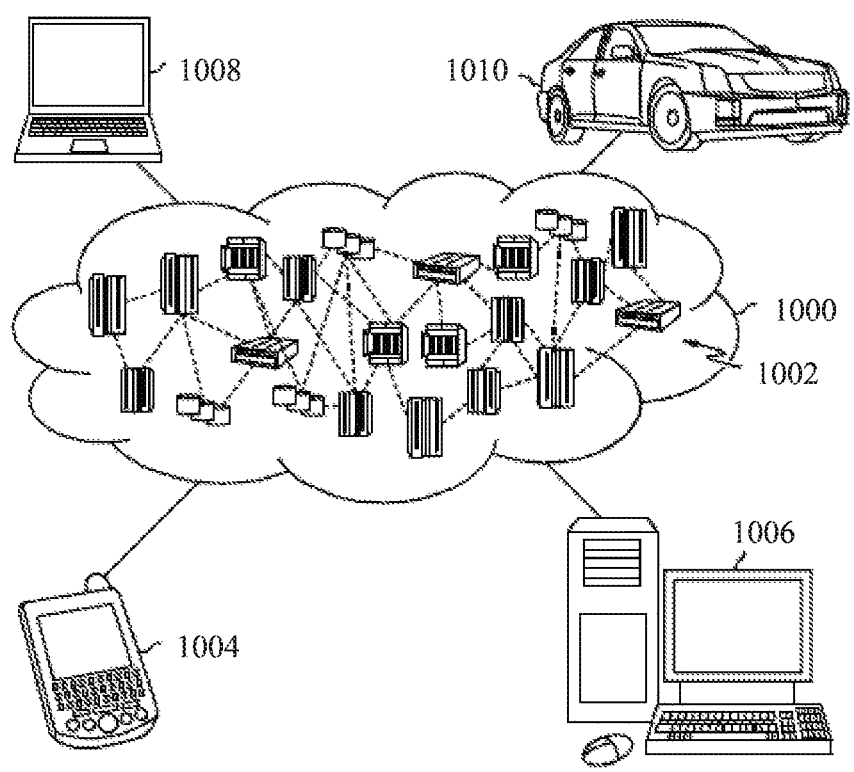
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
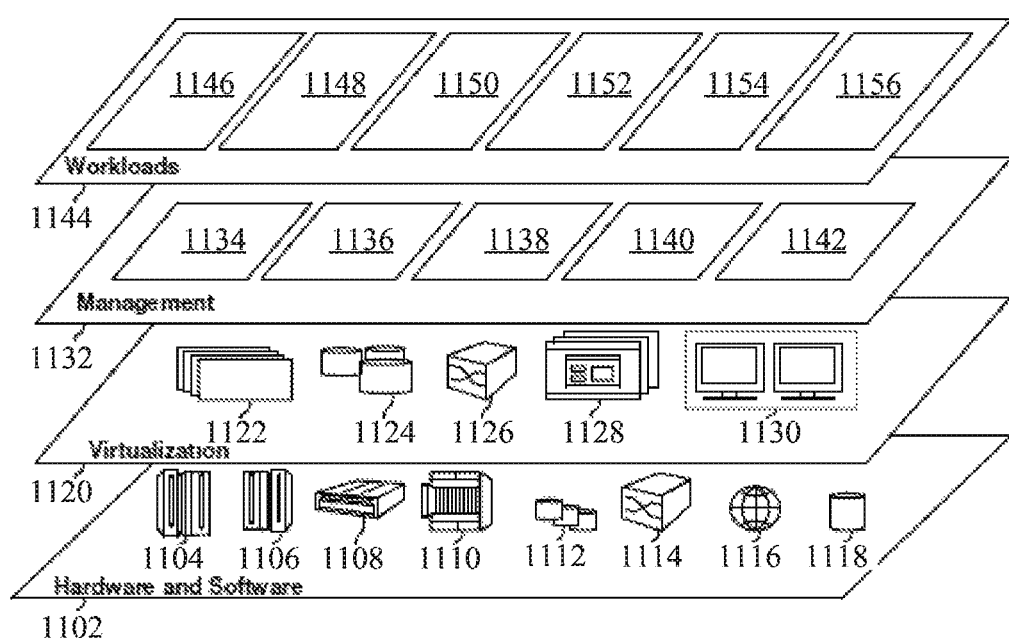
FIG. 11 depicts abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and security credential management 1156. Various embodiments of the present invention can utilize the cloud computing environment described with reference to FIGS. 10 and 11 to facilitate the disbursement of one or more security credentials to facilitate execution of one or more computer application processes.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
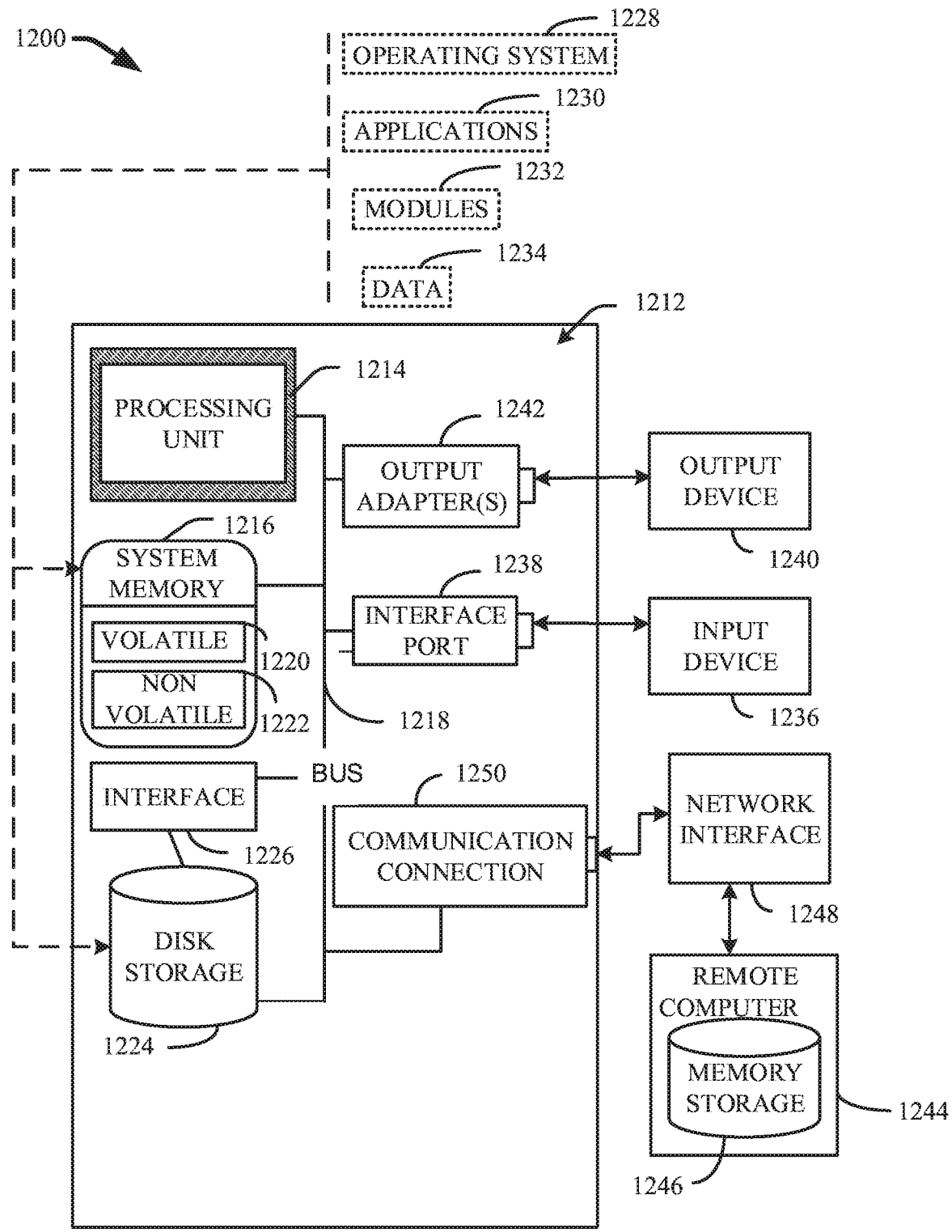
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can include a computer 1212. The computer 1212 can also include a processing unit 1214, a system memory 1216, and a system bus 1218. The system bus 1218 can operably couple system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, can be stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface can be used, such as interface 1226. FIG. 12 also depicts software that can act as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 can take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through one or more input devices 1236. Input devices 1236 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1214 through the system bus 1218 via one or more interface ports 1238. The one or more Interface ports 1238 can include, for example, a serial port, a parallel port, a game port, and a universal serial bus (USB). One or more output devices 1240 can use some of the same type of ports as input device 1236. Thus, for example, a USB port can be used to provide input to computer 1212, and to output information from computer 1212 to an output device 1240. Output adapter 1242 can be provided to illustrate that there are some output devices 1240 like monitors, speakers, and printers, among other output devices 1240, which require special adapters. The output adapters 1242 can include, by way of illustration and not limitation, video and sound cards that provide a means of connection between the output device 1240 and the system bus 1218. It should be noted that other devices and/or systems of devices provide both input and output capabilities such as one or more remote computers 1244.

Computer 1212 can operate in a networked environment using logical connections to one or more remote computers, such as remote computer 1244. The remote computer 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer 1244. Remote computer 1244 can be logically connected to computer 1212 through a network interface 1248 and then physically connected via communication connection 1250. Further, operation can be distributed across multiple (local and remote) systems. Network interface 1248 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor, operably coupled to the memory, and that executes the computer executable components stored in the memory, wherein the computer executable components comprise:
   a trusted platform module component that generates a digital identity token that is bound to a computer application process; and
   a key authenticity component that compares the digital identity token to a security key to retrieve a security credential, wherein the digital identity token comprises a measurement describing a workload of the computer application process, wherein the computer application process generates a plurality of containers co-located within a pod that governs how the plurality of containers are run by the computer application and that describe the workload of the computer application process.

2. The system of claim 1, further comprising:
a policy authenticity component that performs a comparison of the digital identity token to a defined policy that governs the computer application process, wherein retrieval of the security credential is based further on the comparison.

3. The system of claim 1, wherein the digital identity token is signed by a chain of trust that originates from hardware.

4. The system of claim 1, further comprising:
an application component that uses the security credential to execute the computer application process by retrieving data from a database.

5. The system of claim 1, wherein the digital identity token expires after a defined amount of time and wherein a header of the digital identity token comprises a payload that includes data indicative of a geographical region associated with one or more components running the computer application process.

6. A system, comprising:
a memory that stores computer executable components;
a processor, operably coupled to the memory, and that executes the computer executable components stored in the memory, wherein the computer executable components comprise:
a trusted platform module component that generates a digital identity token that is bound to a computer application process; and
a policy authenticity component that compares the digital identity token to a defined policy that governs the computer application process to retrieve a security credential, wherein the digital identity token comprises a measurement describing a workload of the computer application process, wherein the computer application process generates a plurality of containers co-located within a pod that governs how the plurality of containers are run by the computer application process, and wherein the plurality of containers collect one or more claims regarding the computer application process and that describe the workload of the computer application process, and send the one or more claims to the trusted platform module.

7. The system of claim 6, further comprising:
a key authenticity component that performs a comparison of the digital identity token and a security key, and wherein retrieval of the security credential is based further on the comparison.

8. The system of claim 6, wherein the digital identity token is signed by a chain of trust that originates from hardware.

9. The system of claim 6, further comprising:
an application component that uses the security credential to execute the computer application process by retrieving data in accordance with the defined policy.

10. The system of claim 6, wherein the digital identity token expires after a defined amount of time.

11. A computer-implemented method, comprising:
generating, by a system operatively coupled to a processor, a digital identity token that is bound to a computer application process;
comparing, by the system, the digital identity token to a security key to retrieve a security credential, wherein the digital identity token comprises a measurement describing a workload of the computer application process; and
generating, by the system, a plurality of containers co-located within a pod, wherein the pod governs how the plurality of containers are run by the computer application process, and wherein the plurality of containers collect one or more claims regarding the computer application process and that describe the workload of the computer application process.

12. The computer-implemented method of claim 11, further comprising:
comparing, by the system, the digital identity token to a defined policy that governs the computer application process, wherein retrieval of the security credential is based further on the comparing the digital identity token to the defined policy.

13. The computer-implemented method of claim 11, wherein the digital identity token is signed by a chain of trust that originates from hardware.

14. The computer-implemented method of claim 11, further comprising:
executing, by the system, the computer application process by using the security credential to retrieve data from a database.

15. The computer-implemented method of claim 11, wherein the digital identity token expires after a defined amount of time.

16. A computer-implemented method, comprising:
generating, by a system operatively coupled to a processor, a digital identity token that is bound to a computer application process;
comparing, by the system, the digital identity token to a defined policy that governs the computer application process to retrieve a security credential, wherein the digital identity token comprises a measurement describing a workload of the computer application process; and
generating, by the system, a plurality of containers co-located within a pod, wherein the pod governs how the plurality of containers are run by the computer application process, and wherein the plurality of containers collect one or more claims regarding the computer application process and that describe the workload of the computer application process, and send the one or more claims to the trusted platform module.

17. The computer-implemented method of claim 16, further comprising:
comparing, by the system, the digital identity token and a public key, wherein retrieval of the security credential is based further on the comparing of the digital identity token and the public key.

18. The computer-implemented method of claim 16, wherein the digital identity token is signed by a chain of trust that originates from hardware.

19. The computer-implemented method of claim 16, further comprising:
executing, by the system the computer application process by using the security credential to retrieve data in accordance with the defined policy.

20. The computer-implemented method of claim 16, wherein the digital identity token expires after a defined amount of time.

21. A computer program product for distribution of a security credential, the computer program product comprising a computer readable storage medium having program instructions embodied therewith, the program instructions executable by a processor to cause the processor to:
- generate, by a system operatively coupled to the processor, a digital identity token that is bound to a computer application process;
- compare, by the system, the digital identity token to a security key to retrieve the security credential, wherein the digital identity token comprises a measurement describing a workload of the computer application process; and
- generate, by the system, a plurality of containers co-located within a pod, wherein the pod governs how the plurality of containers are run by the computer application process, and wherein the plurality of containers collect one or more claims regarding the computer application process and that describe the workload of the computer application process, and send the one or more claims to the trusted platform module.

22. The computer program product of claim 21, wherein the program instructions further cause the processor to:
- compare, by the system, the digital identity token to a defined policy that governs the computer application process, wherein retrieval of the security credential is based further on the comparing the digital identity token to the defined policy.

23. The computer program product of claim 22, wherein the program instructions further cause the processor to:
- execute, by the system the computer application process by using the security credential to retrieve data in accordance with the defined policy.

24. The computer program product of claim 21, wherein the digital identity token is generated in the cloud computing environment.

25. The computer program product of claim 21, wherein the digital identity token expires after a defined amount of time, and wherein the digital identity token is signed by a chain of trust that originates from hardware.

* * * * *